G. SCHAEFER.
STANDING GRAIN THRASHING MECHANISM.
APPLICATION FILED APR. 21, 1920.

1,418,476.

Patented June 6, 1922.
8 SHEETS—SHEET 1.

INVENTOR
George Schaefer.
BY
Fred G. Dieterich
ATTORNEYS

G. SCHAEFER.
STANDING GRAIN THRASHING MECHANISM.
APPLICATION FILED APR. 21, 1920.

1,418,476.

Patented June 6, 1922.
8 SHEETS—SHEET 2.

INVENTOR
George Schaefer.
BY
Fred G. Dieterich
ATTORNEYS

G. SCHAEFER.
STANDING GRAIN THRASHING MECHANISM.
APPLICATION FILED APR. 21, 1920.

1,418,476.

Patented June 6, 1922.
8 SHEETS—SHEET 3.

Fig. 3.

INVENTOR
George Schaefer.
BY
Fred G. Dieterich Co.
ATTORNEYS

G. SCHAEFER.
STANDING GRAIN THRASHING MECHANISM.
APPLICATION FILED APR. 21, 1920.

1,418,476.

Patented June 6, 1922.
8 SHEETS—SHEET 4.

Fig. 4.

INVENTOR
George Schaefer.
BY
Fred G Dreterich
ATTORNEYS

G. SCHAEFER.
STANDING GRAIN THRASHING MECHANISM.
APPLICATION FILED APR. 21, 1920.

1,418,476.

Patented June 6, 1922.
8 SHEETS—SHEET 5.

INVENTOR
George Schaefer.
BY
ATTORNEYS

G. SCHAEFER.
STANDING GRAIN THRASHING MECHANISM.
APPLICATION FILED APR. 21, 1920.

1,418,476.

Patented June 6, 1922.
8 SHEETS—SHEET 6.

UNITED STATES PATENT OFFICE.

GEORGE SCHAEFER, OF RUSSELL, KANSAS.

STANDING-GRAIN THRASHING MECHANISM.

1,418,476. Specification of Letters Patent. Patented June 6, 1922.

Application filed April 21, 1920. Serial No. 375,457.

*To all whom it may concern:*

Be it known that I, GEORGE SCHAEFER, a citizen of the United States, residing at Russell, in the county of Russell and State of Kansas, have invented a new and Improved Standing-Grain Thrashing Mechanism, of which the following is a specification.

This invention relates to the art of thrashing standing grain and an object of the invention is to provide a thrasher for this purpose which is of a simple, efficient and durable construction, combining simplicity, rigidity, ease of operation and cheapness to manufacture.

Another object of the invention is to provide a novel arrangement and combination of parts operating in conjunction with an improved grain gathering mechanism (forming the subject matter of my copending application filed March 15, 1920, Serial No. 365991) to constitute a machine with capacity and arrangement for successfully handling the air from the blower feeder, which is essential to the successful operation of the stripping cylinder.

A further object of the invention is to provide an arrangement of parts in such manner that the machine will be as evenly balanced within the frame as possible, thus ensuring long life and ease of operation.

In its general nature, the invention resides in those novel features of construction, combination and arrangement of parts, all of which will be first fully described, and then be specifically pointed out in the appended claims, reference being had to the accompanying drawings, in which:

In the drawings, in which like numerals of reference indicate like parts in all of the figures, 1 represents the grain pan of the gathering mechanism, which mechanism includes the stripping cylinder 2 and the screw conveyer 3 for delivering the gathered material to a central position from whence it is discharged into the blower 14. The grain gathering mechanism herein shown and described constitutes the subject matter of my copending application aforesaid and a general description of the same is therefore thought to be sufficient for the purpose of the present application. The gathering mechanism is provided with side frames 4 which carry the bearings for the stripping cylinder drive shaft 5, the latter having a pulley 6 over which the drive belt (later referred to) is adapted to pass. The stripping cylinder drive shaft 5 is provided with a gear 7 that meshes with an idler gear 8 which is secured to a sprocket 9 over which a drive chain 10 passes; the chain 10 also passes over the sprocket 11 of the screw conveyer shaft. The aforesaid parts are mounted on the main angle iron 12 which is carried by the pivoted carrier arms 13. The blower 14 which constitutes a part of the gathering mechanism unit, has its shaft 15 mounted in bearings 17 in a special frame 16 and the shaft 15 has a pulley 18 over which a driving belt 19 passes.

The motor supporting frame is composed of main frame longitudinal angle irons 20 which are secured to the lower main frame 21 that sustains the wheel bearings 22 for the traction wheels 23. 24 designates the upper angle frame which carries the thrashing mechanism proper and is supported above the lower main frame 21 by the uprights 25 and diagonal braces 26. The motor supporting frame 20 is braced from the lower main frame 21 by the horizontal diagonal braces 27. The tiller pole 28 is connected to the frame angle irons 20 and at its rear end is connected with the operator's platform 31 which sustains the bearings for the tiller wheels 29 and tiller 30.

Figures 7, 10:
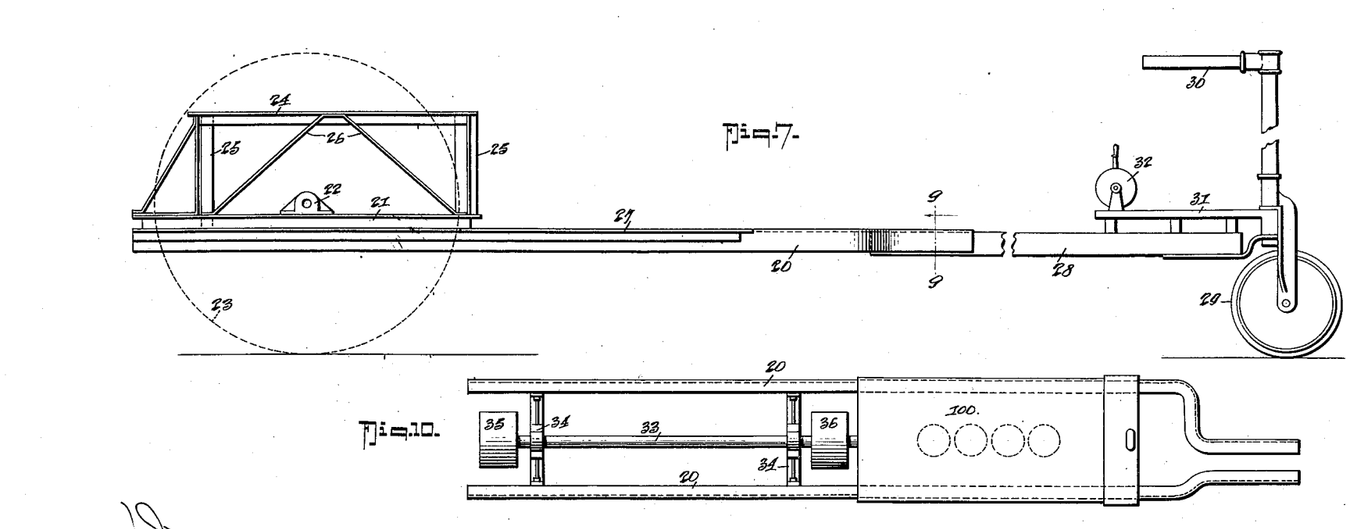
Figure 7 is a side elevation of the frame and traction wheels, the harvesting mechanism, motor, etc., being removed.
Figure 10 is a detail top plan view of the motor carrying frame section with the motor and main or first motion shaft in place.
Figure 8:
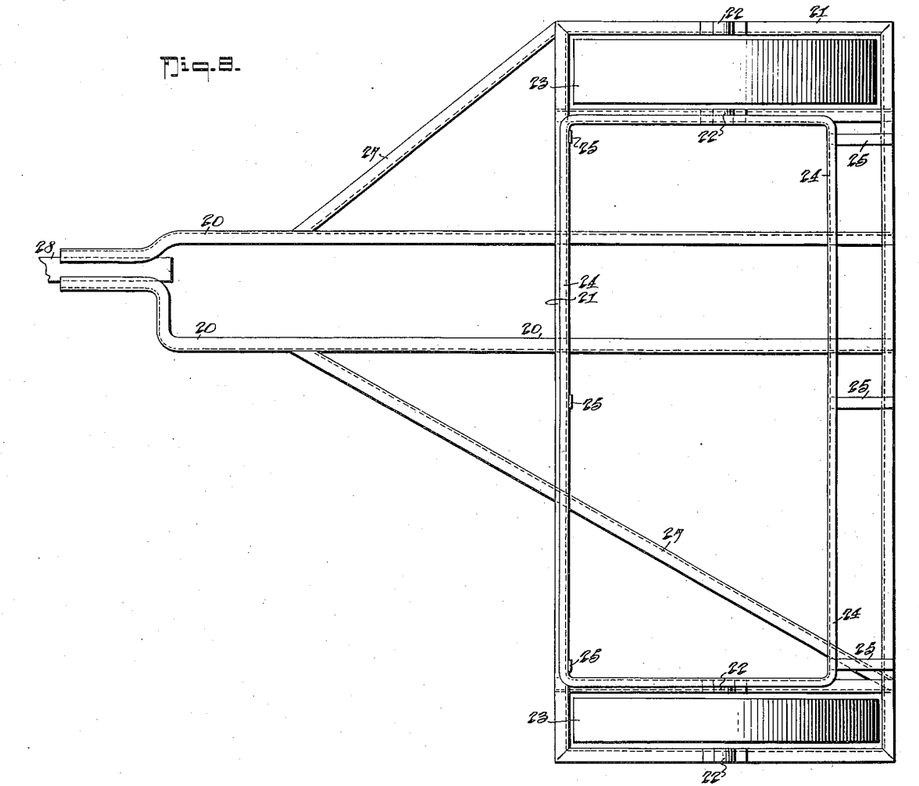
Figure 8 is a top plan view of the same.
Figure 9:
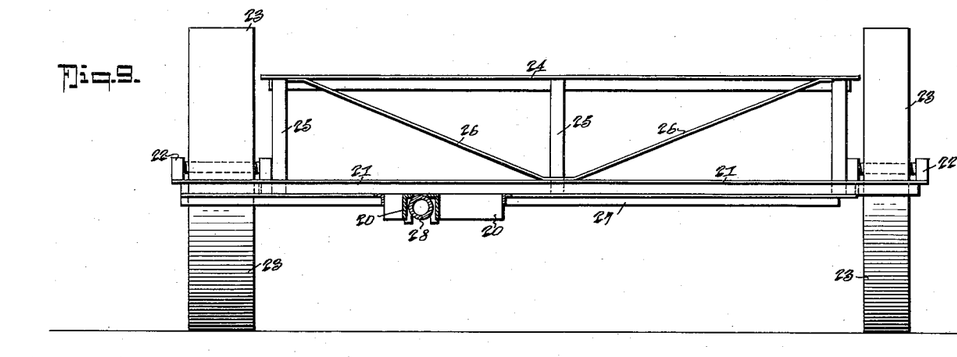
Figure 9 is a cross section on the line 9—9 of Figure 7.

The power plant 100 is mounted on the main frame draft angle irons 20, as best shown in Figure 10 of the drawings and the main shaft (first motion shaft) 33 is mounted in bearing hangers 34 sustained by the draft angles 20, and the first motion shaft 33 is provided with a front drive pulley 35 and a rear drive pulley 36 for purposes later explained.

The thrashing cylinder case 37 is supported by standards 38 which are mounted on the upper angle frame 24 and the cylinder case 37 is also supported by cross supports 39—39—50. The cylinder 40 has its shaft supported in suitable bearings and it is provided with teeth 42 of the usual construction to cooperate with the teeth 41 on the solid concaves. The cylinder shaft 43 is provided with a drive pulley 44 and is driven by a belt 45 from the front drive pulley 35.

46 designates the solid concaves which carry the teeth 41 and 48 designates the perforated concaves, the concaves 46 and 48 being carried in a concave rest frame 47 which is pivoted at 49 and is adapted to be adjusted through a cam device 51, as shown. 52 designates an extension plate from the end of the solid concaves to the adjacent wall of the cylinder case so as to prevent the grain and straw from passing below the case at this point. 53 designates a deflector plate at the entrance to the cylinder case 37, where the duct 54 from the blower 14 communicates with the cylinder case, the duct 54 including telescoping sections 55 sustaining aprons 56, as shown, to allow for the raising and lowering of the gathering mechanism.

59 designates the grain pan which carries the fishbacks 58, the shoe 57 supporting the separating screens 62. The grain separating shoe and the grain pan are rockably supported by hangers 60 from brackets 61 which are supported on the upper angle frame 24. 63 designates the grain discharge chute and 64 the end board of the grain separating shoe which deflects unthrashed grain and chaff into the grain and chaff chute 65 from which the grain and chaff is delivered to the auxiliary blower 66 which, through the duct 67, returns the same to the thrashing cylinder case 37.

The blower 66 has a shaft 105 with pulley 106 and receives its power through belt 107 from a pulley 108 on the blower shaft 77.

68 designates the shaker crank shaft which gives impetus, through the pitman 101, to the grain separating shoe and also to the grain pan 59, rocking them in opposite directions.

The grain from the discharge chute 63 is deposited into the entrance of the grain elevator 69 by which the grain is elevated and deposited into a chute 70 that delivers it to the sacking measure 71. The operator, on the platform 72, sacks the grain from the measure 71, the platform 72 being supported at 73 from the main frame and, if desired, it may be provided with a seat 74 for the operator's convenience.

75 indicates the cleaner fan casing in which the cleaner fan rotator 76 operates. The shaft 77 of the cleaner fan is provided with a sprocket 79 around which a driving chain 81 passes, the chain 81 also passing around a sprocket 80 on the crank shaft 68.

Figure 1:
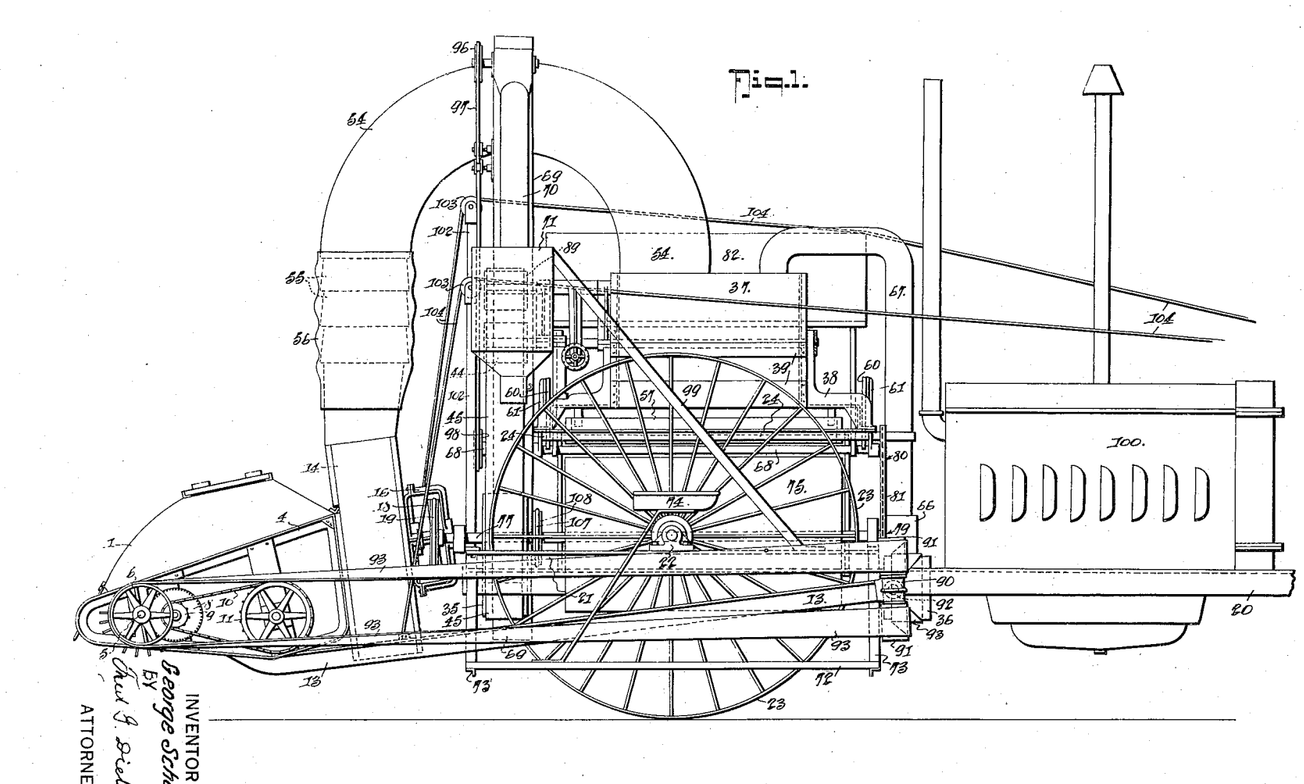
Figure 1 is a side elevation of the assembled machine (the rear portion of the frame carrying the operator's platform and the tiller, etc., being broken away) depicting the operative position of the motor and stripping cylinder pan (gathering mechanism) with respect to the machine proper, and the almost even balance effected by this arrangement of parts.
Figure 2:
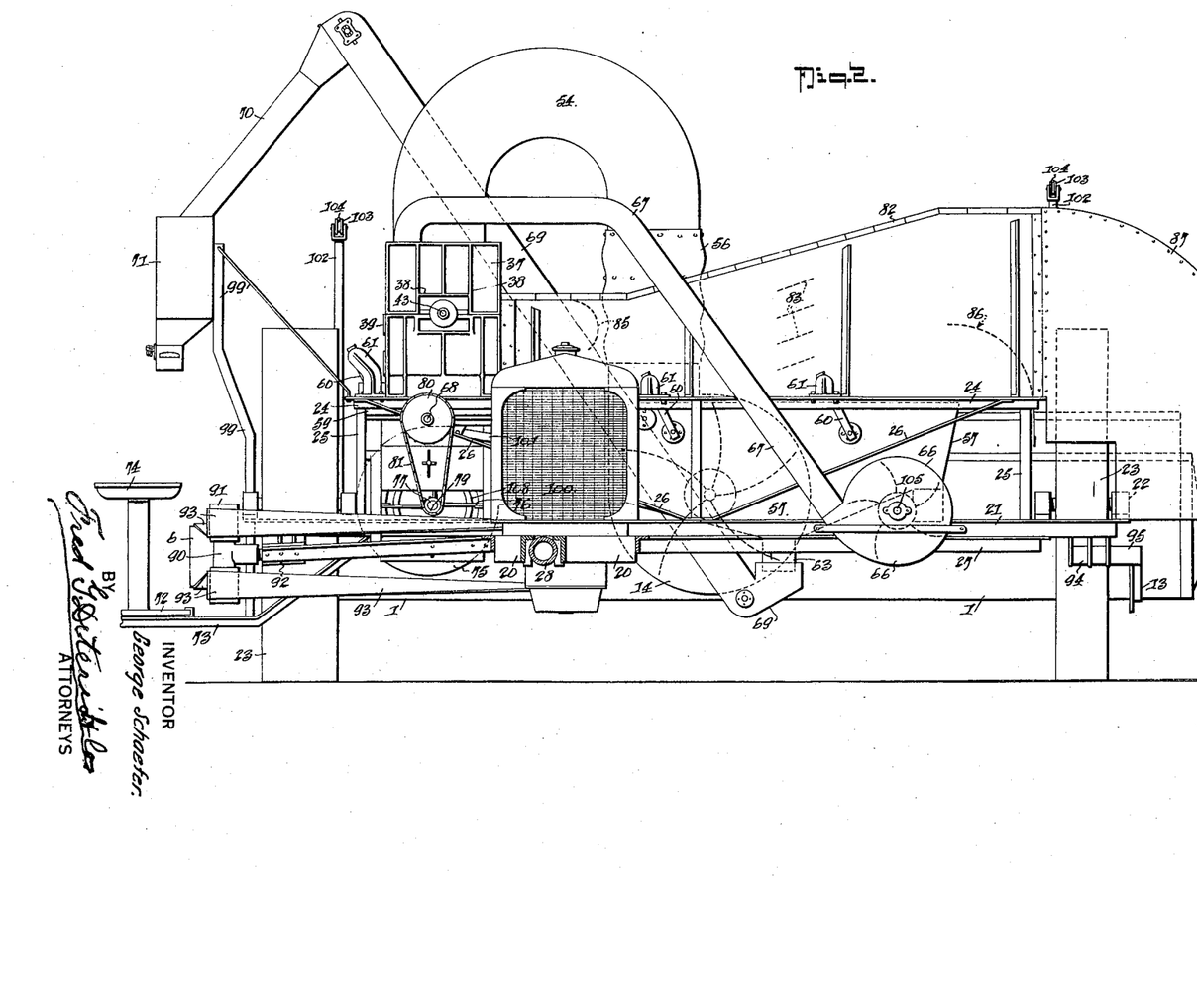
Figure 2 is a rear elevation of the parts of the assembled machine shown in Figure 1.
Figure 3:
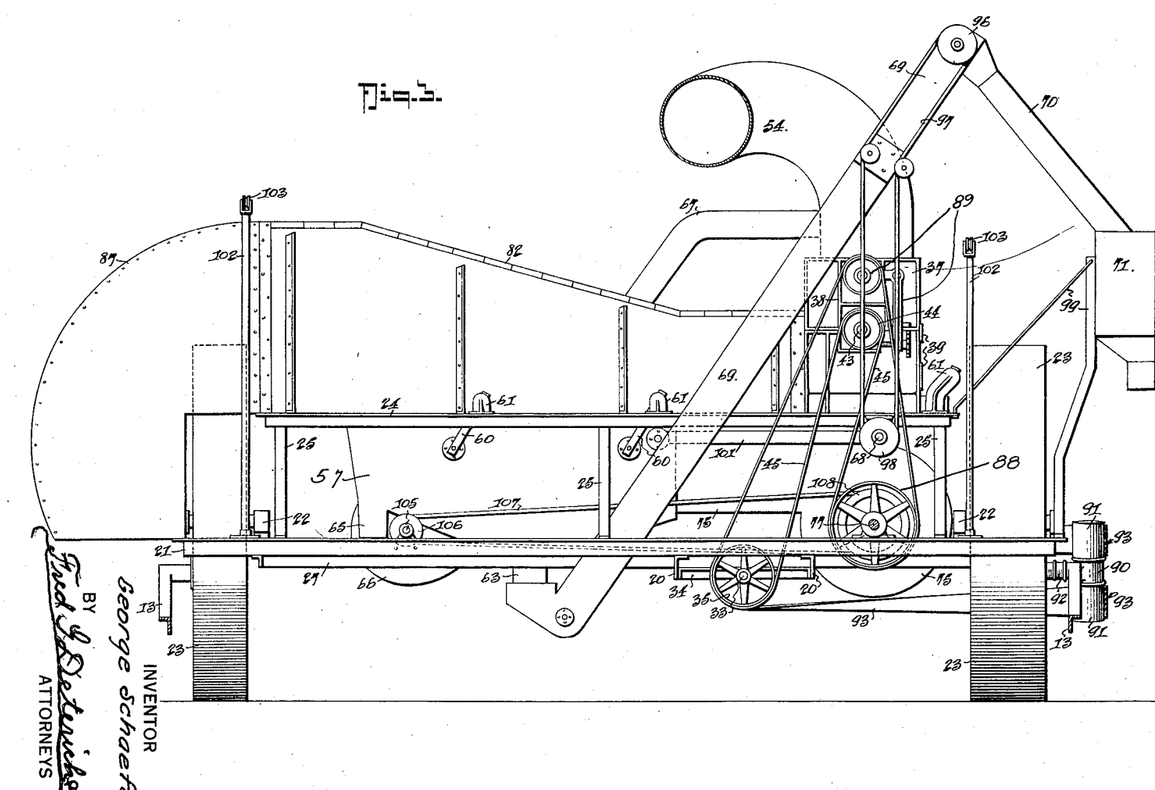
Figure 3 is a vertical cross section of the machine on the line 3—3 of Figure 4.
Figure 4:
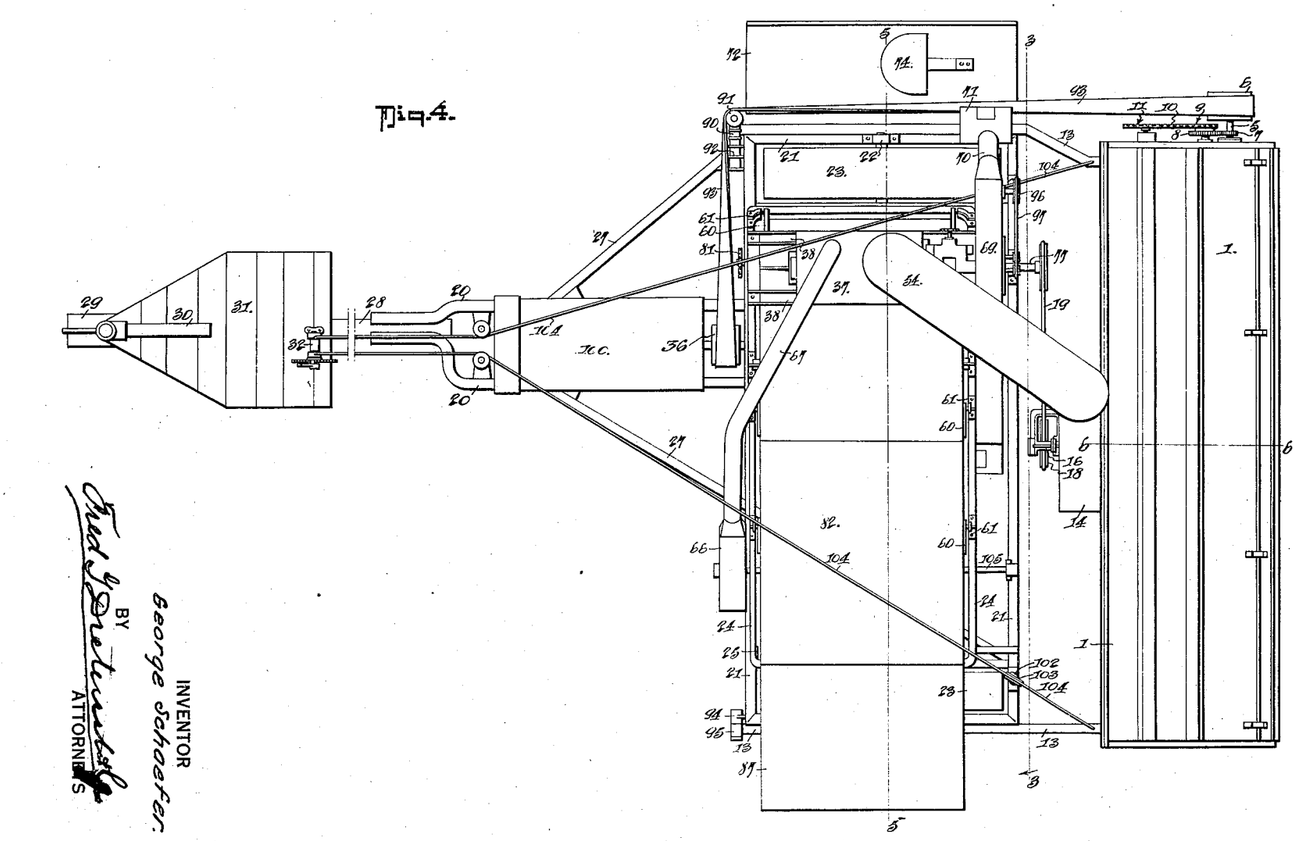
Figure 4 is a top plan of the same.
Figure 5:
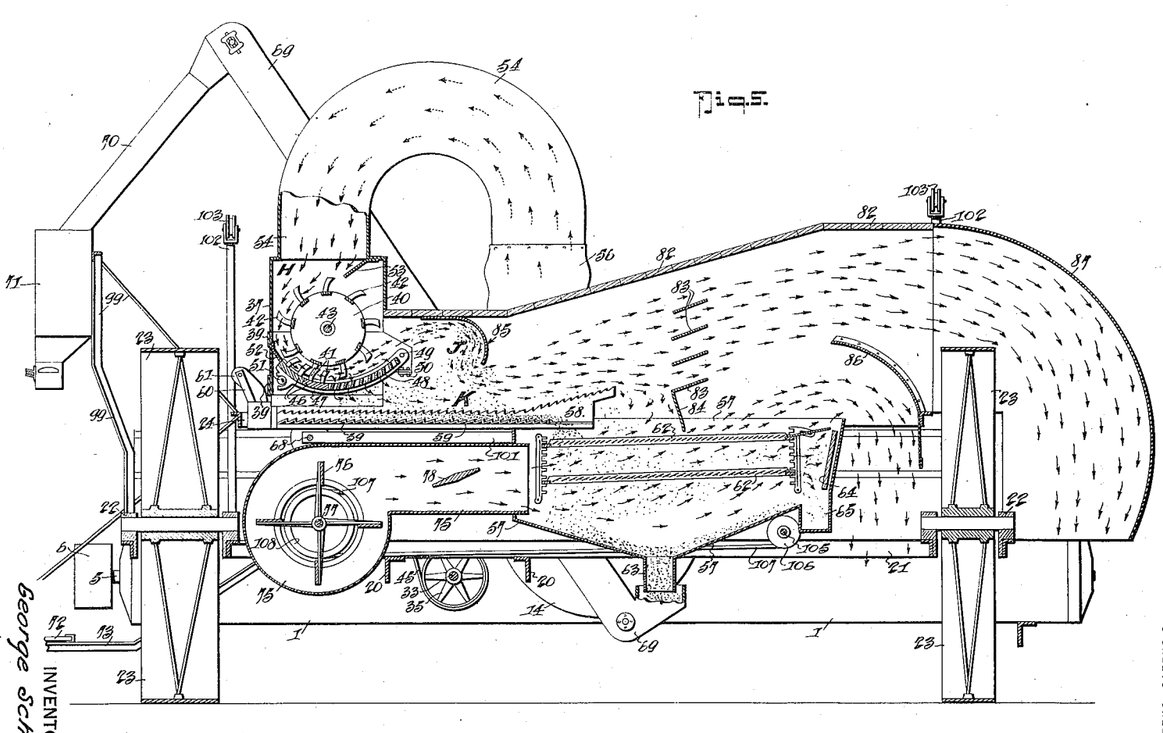
Figure 5 is a vertical cross section taken substantially on the line 5—5 of Figure 4.
Figure 6:
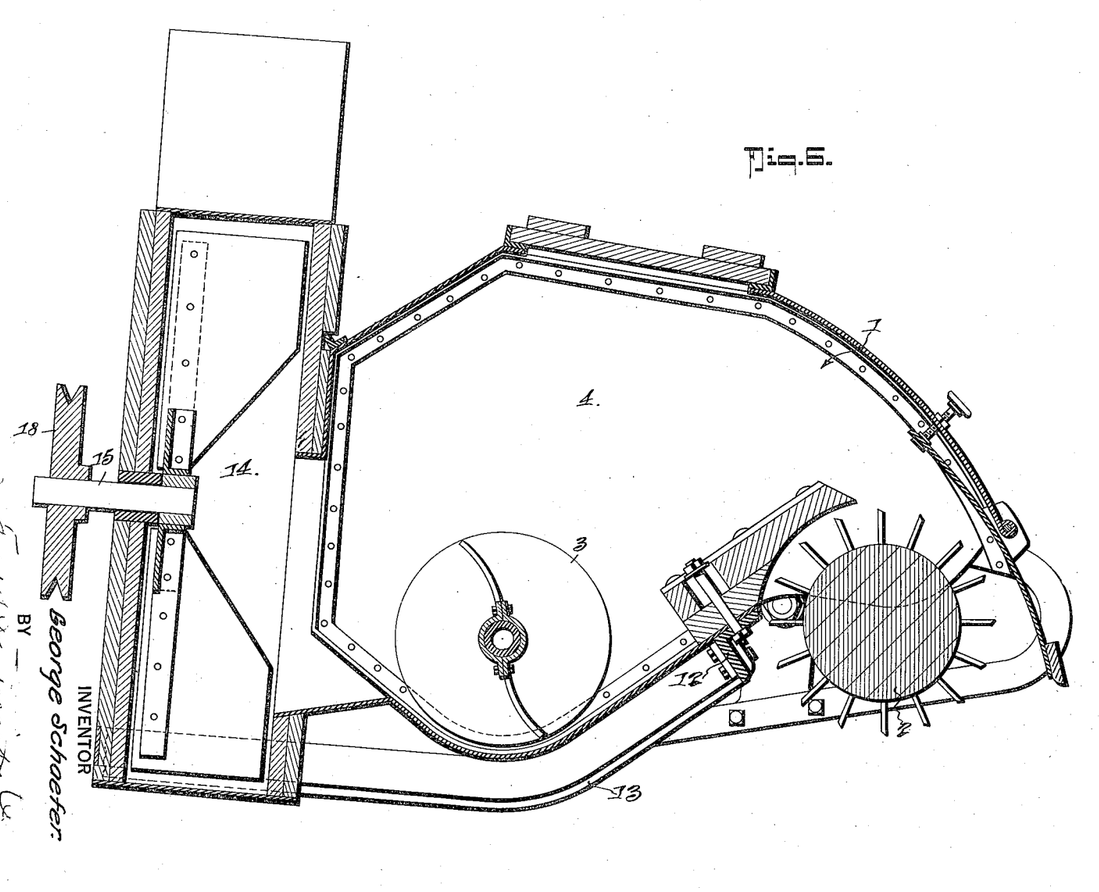
Figure 6 is a detail vertical longitudinal section taken substantially on the line 6—6 of Figure 4, through the gathering mechanism showing the action of the same.

The cleaner fan projects its blast endwise against the separating screens 62 and between and below the same, as best shown in Figure 5 of the drawings, and the cleaner fan is provided with a suitable damper 78, as shown.

82 represents the grain separating shoe cover in which there is provided a series of upwardly angled deflectors 83, the lower one of which is provided with an apron 84 that extends down into close proximity to the upper separating screen 62 for a purpose presently explained.

At the front of the grain separating shoe cover and adjacent to the thrashing cylinder there is provided a curved deflector or baffle 85 which directs the air stream downwardly and forwardly toward the grain pan 59.

Toward the rear of the grain separating shoe cover (rear when considered in the direction of the moving material) there is provided a deflector 86 and a hood 87 whereby the chaff and straw is deposited adjacent to the right hand traction wheel and below the machine at the rear of the gathering mechanism, so as not to interfere with the gathering of the grain ahead.

88 designates the cleaner fan drive pulley around which the driving belt 45 takes, the belt 45 also passing around an idler pulley and belt tightener 89 and around the first motion shaft drive pulley 35. Thus, positive motion is imparted from the front main drive pulley 35 to the cleaner fan shaft and to the thrashing cylinder shaft.

The supporting arm 13 on the left side of the machine is attached at the rear to a specially devised casting 90 which is pivotally mounted on a second casting 92 providing means whereby the pan 1 can be raised and lowered for thrashing as the case at hand demands. The swinging casting 90 is arranged to carry two small belt pulleys 91 disposed to direct the driving belt 93 from the rear main pulley 36 around the corner of the stripping cylinder pulley 6. It is clearly understood that by this construction the guide pulleys 91 are swung around in direct proportion with the raising and lowering of the pan. This construction enables a satisfactory belt drive to be used, thus eliminating expensive gears and transmissions and making it possible to attach and detach the power unit for shipping purposes, no skill being required to mount and unmount the same.

On the right hand side there is provided a bearing bracket 94 for the outer bearing 95 to which right hand pivoted carrier arm 13 is secured so as to cooperate with the pivoted casting 90.

96 designates the grain elevator drive pulley around which the grain elevator driving belt 97 passes; this belt also passing over a pulley 98 on the crank shaft 68.

A suitable support 99 is provided for the sacking measure.

Mounted on posts 102 are sheaves 103 over which the cables 104 pass, the cables 104 being connected to the arms 13 and at their other ends are adapted to be secured to takeups 32 on the operator's platform so as to hold the gathering mechanism in its proper elevation from the ground and to allow for adjusting the position of the gathering mechanism to suit the particular height of the grain operated upon.

Any suitable draft mechanism may be employed to move the machine over the field and as that constitutes, per se, no part of the invention, I deem it unnecessary to illustrate the same.

From the foregoing it will be observed, especially by referring to Figure 5 of the drawings, that the grain and straw from the stripping cylinder pan 1 drawn in by the suction from the blower 14 passes through the blower pipe or duct 54 and is directed downwardly into the thrashing cylinder housing 37 on top of the revolving thrashing cylinder 40 and its teeth 42 as at H, the deflector 53 located at the top of the cylinder case 37 causing all grain and straw to be deposited to the top and rear of the cylinder, as clearly indicated by the arrows. By force of the blower and in conjunction with the rapidly revolving thrashing cylinder, the straw and grain is thrown around the bottom of the cylinder over the concaves 46, as in the ordinary practice, the concaves being solid cause the air from the blower to take a direct rearward course and pass over the open or perforated concaves 48, this section of the concaves being maintained at such angle as to direct the bulk of air to a point in the top of the shoe cover 82 adjacent to the top and rear part of the curved deflector 85, which, in turn, directs the air, straw, grain, etc. coming through the thrashing cylinder from the blower, in a downward direction, as indicated by the arrows at J, and at this point, in turning the course of the grain, the grain being the heavier falls upon the grain pan 59, and by the reciprocating motion of this pan is finally moved back and dropped onto the separating screens 62 for final separation. The deflectors 83 being permanently arranged within the cover 82 are provided at the bottom with a heavy canvas or several thicknesses of canvas 84, as above stated, extending to a point very near the chaffer-screen in the shoe, the object being to retard the swiftly moving straw, etc., at this point over the chaffer-screen, also to create within that space between the canvas 84 and the edge of the cylinder concave 48 what may be called a "dead air space," the object being to prevent the rapidly moving air from the blower, when passing around the end of the deflector 85, from coming into contact with and blowing away the straw, etc., which is located along the grain pan on the fish backs 58, between the space marked K and the apron or canvas 84. The air being dead within this space tends to keep the live air above the fish back and as the same reaches the deflectors 84, owing to the upwardly extending position of these deflectors the air is deflected upwardly and is carried entirely away from the separating shoe, thus eliminating completely the damaging effects of the air if allowed to pass through the machine in an uncontrolled manner. The air from the blower leaves the machine by way of the hood 87 and such straw, chaff, etc. as is carried out is thereby caused to be dropped at a point near the bottom of the wheel 23 at the right hand side of the machine, a place that will not interfere with the grain that has not thus far been thrashed. The separation of the grain from the straw, chaff, etc. in the shoe 57 is assisted by the cleaner fan 75 in a manner similar to the accepted standards of thrashing, the straw being blown off the end of the shoe over the top of the end board 64 and passed out under the deflector 86, the same being dropped on the inside of the wheel, hence it cannot later hinder in further thrashing.

It will also be observed that the notched bottom of the grain pan and the fish back 58 also materially assist in moving the straw and grain.

In Figure 5 of the drawings, the arrows and dots indicate respectively the directions of the air currents and movements of the grain.

From the foregoing description taken in connection with the accompanying drawings, it is thought the complete construction, operation and advantages of the invention will be clear to those skilled in the art.

What I claim is:—

1. In standing grain thrashers, a wheeled supporting frame, a grain gathering mechanism mounted on the frame and including grain severing mechanism and a hood having a restricted entrance below which said severing mechanism is located and a suction blower for drawing the grain through the restricted entrance of said hood and delivering the grain to the thrashing machine proper, a thrashing machine proper including a thrashing cylinder case mounted on said frame, a duct between said suction blower and said thrashing cylinder case, and means for operating the aforesaid mechanism.

2. In standing grain thrashers, a wheeled supporting frame, a grain gathering mechanism vertically adjustably mounted on said frame and including a grain severing mechanism and a suction blower for delivering the grain gathered to the thrashing machine proper, a thrashing machine proper including a thrashing cylinder case mounted on said frame, a duct between said suction blower and said thrashing cylinder case, which duct includes telescopic members, and means for operating the aforesaid mechanism.

3. In standing grain thrashers, a wheeled supporting frame, a grain gathering mechanism vertically adjustably mounted on said frame and including a grain severing mechanism and a suction blower for delivering the grain gathered to the thrashing machine proper, a thrashing machine proper including a thrashing cylinder case mounted on said frame, a duct between said suction blower and said thrashing cylinder case, which duct includes telescopic members, means for operating the aforesaid mechanism and spacing connections between the telescopic members for keeping said members in cooperative relation.

4. In standing grain thrashers, a wheeled frame comprising a transverse section, a thrashing mechanism proper supported on said transverse section, a longitudinal section, a power plant mounted on said longitudinal section and including a first motion shaft, a grain gathering mechanism mounted on said frame and power transmitting mechanism between said first motion shaft and said grain gathering and thrashing mechanisms respectively.

5. In standing grain thrashers, a transverse rectangular frame, a pair of wheels supporting said frame, a longitudinal frame section attached to said rectangular frame and extending rearwardly therefrom, a thrashing mechanism proper mounted in the rectangular frame transversely with respect to the direction of travel of the machine, a grain gathering mechanism mounted in front of said rectangular frame and cooperating with said thrashing mechanism proper, a power plant mounted on the rearwardly extending frame section, and means for operating the gathering and thrashing mechanisms respectively from said power plant.

6. In standing grain thrashers, a transverse rectangular frame, a pair of wheels supporting the same, a longitudinal frame attached to said rectangular frame and extending rearwardly therefrom, a thrashing machine proper mounted in said rectangular frame and substantially balanced over the axis of said wheels, a grain gathering mechanism mounted in front of said rectangular frame and cooperating with said thrashing mechanism proper, a power plant mounted on the rearwardly extending frame section, and means for operating the gathering and thrashing mechanisms from said power plant.

7. In standing grain thrashers, a main rectangular frame, a pair of wheels supporting the same, a frame attached to said rectangular frame and extending rearwardly therefrom, a thrashing machine proper mounted in said rectangular frame and substantially balanced over the axis of said wheels, a grain gathering mechanism mounted in front of said rectangular frame and cooperating with said thrashing mechanism proper, a power plant mounted on the rearwardly extending frame section, means for operating the gathering and thrashing mechanisms from said power plant, said gathering mechanism, said power plant and said thrashing mechanism proper being arranged to form a substantially balanced structure with the axis of the wheels as a fulcrum.

8. In standing grain thrashers, a wheeled frame comprising a main section, a rearwardly extended section, main wheels mounted in bearings on said main frame section, a tiller wheel mounted on said rearwardly extended frame section, a thrasher machine proper mounted on said main frame section, a power plant mounted on said rearwardly extended section to the rear of the thrashing machine proper and including a first motion shaft extending under the thrashing machine proper and having a front and a rear drive pulley, means for operating the thrashing machine proper from one of said drive pulleys, a grain gathering mechanism and a suction blower, means for mounting said gathering mechanism and blower at the front of the machine, means for operating said gathering mechanism from another of said pulleys, and means for operating said suction blower from a driven part of said thrashing machine proper.

9. In standing grain thrashers, a wheeled frame comprising a main section, a rearwardly extended section, main wheels mounted in bearings on said main frame section, a tiller wheel mounted on said rearwardly extended section, a thrashing machine proper mounted on said main frame section, a power plant mounted on said rearwardly extended section to the rear of the thrashing machine proper and including a first motion shaft extending under the thrashing machine proper and having a front and a rear drive pulley, means for operating the thrashing machine proper from the front drive pulley, a grain gathering mechanism including a stripping cylinder, a suction blower, means for mounting said gathering mechanism and suction blower at the front of the machine, means for operating the stripping cylinder of said grain gathering mechanism from the rear one of said pulleys, and means for operating said suction blower.

10. In standing grain thrashers, a frame, a thrashing machine proper carried thereby, a pair of supporting wheels for said frame between which said thrashing machine proper lies, a power plant on the frame to the rear of said thrashing machine proper and said supporting wheels and including a first motion shaft, a grain gathering mechanism in front of said supporting wheels and the thrashing machine proper, supporting arms for said gathering mechanism which are hingedly mounted on said frame, a drive pulley on said first mentioned shaft and a belt drive from said pulley to said gathering mechanism, said thrashing machine proper, said power plant and said gathering mechanism being relatively located with respect to the transverse axis of said supporting wheels so as to constitute a substantially balanced structure.

11. In standing grain thrashers, a frame, a thrashing machine proper carried thereby, a pair of supporting wheels for said frame between which said thrashing machine proper lies, a power plant on the frame to the rear of said thrashing machine proper and including a first motion shaft, a grain gathering mechanism in front of said supporting wheels and the thrashing machine proper, supporting arms for said gathering mechanism which are hingedly mounted on said frame, a drive pulley on said first mentioned shaft, a belt drive from said pulley to said gathering mechanism, said belt drive including a driving belt and belt guide pulleys, the latter being located at the hinge axis of said arms.

12. In standing grain thrashers, a wheeled supporting frame, a grain gathering mechanism carried thereby and including grain severing devices and a suction blower for creating a suction in the gathering mechanism and for delivering the gathered material therefrom, a thrashing machine proper carried by said frame and including a thrashing cylinder and its case, concaves cooperating with the cylinder, a grain pan, a grain separating shoe, a grain pan and shoe cover over the same into which the material is discharged from the cylinder case, said blower having a duct delivering into said cylinder case and serving to create an air stream through the thrashing machine proper from the entrance to the straw and chaff outlet, a grain elevator for receiving the grain from the shoe and delivering it therefrom and means for operating the aforesaid mechanism.

13. In standing grain thrashers, a wheeled supporting frame, a grain gathering mechanism carried thereby and including grain severing devices and a suction blower for creating a suction in the gathering mechanism and for delivering the gathered material therefrom, a thrashing machine proper carried by said frame and including a thrashing cylinder and its case, concaves cooperating with the cylinder, a grain pan, a grain separating shoe, a grain pan and shoe cover over the same into which the material is discharged from the cylinder case, said blower having a duct delivering into said cylinder case and serving to create an air stream through the thrashing machine proper from the entrance to the straw and chaff outlet, a grain elevator for receiving the grain from the shoe and delivering it therefrom, means for operating the aforesaid mechanisms, and means for creating a dead air space over the grain pan and the uppermost chaffer-screen of the separating shoe.

14. In standing grain thrashers, a wheeled supporting frame, a grain gathering mechanism carried thereby and including grain severing devices and a suction blower for creating a suction in the gathering mechanism and for delivering the gathered material therefrom, a thrashing machine proper carried by said frame and including a thrashing cylinder and its case, concaves cooperating with the cylinder, a grain pan, a grain separating shoe, grain pan and shoe cover over the same into which the material is discharged from the cylinder case, said blower having a duct delivering into said cylinder case and serving to create an air stream through the thrashing machine proper from the entrance to the straw and chaff outlet, a grain elevator for receiving the grain from the shoe and delivering it therefrom, means for operating the aforesaid mechanisms, means for creating a dead air space over the grain pan and the uppermost chaffer-screen of the separating shoe, and means to elevate the straw passing along the grain pan above the dead air space at the exit end of the grain pan.

15. In standing grain thrashers, a wheeled supporting frame, a grain gathering mechanism carried thereby and including grain severing devices and a suction blower for creating a suction in the gathering mechanism and for delivering the gathered material therefrom, a thrashing machine proper carried by said frame and including a thrashing cylinder and its case, concaves cooperating with the cylinder, a grain pan, a grain separating shoe, a grain pan and shoe cover over the same into which the material is discharged from the cylinder case, said blower having a duct delivering into said cylinder case and serving to create an air stream through the thrashing machine proper from the entrance to the straw and chaff outlet, a grain elevator for receiving the grain from the shoe and delivering it therefrom, means for operating the aforesaid mechanisms, means for creating a dead air space over the grain pan and the uppermost chaffer-screen of the separating shoe, said means including a turn-back baffle in the cover adjacent to the cylinder case and upwardly directed baffles to the rear of the grain pan, the lower one of which has an apron extending down to the upper chaffer-screen of the shoe.

16. In standing grain thrashers, a wheeled supporting frame, a grain gathering mechanism carried thereby and including grain severing devices and a suction blower for creating a suction in the gathering mechanism and for delivering the gathered material therefrom, a thrashing machine proper carried by said frame and including a thrashing cylinder and its case, concaves cooperating with the cylinder, a grain pan, a grain separating shoe, a grain pan and shoe cover over the same into which the material is discharged from the cylinder case, said blower having a duct delivering into said cylinder case and serving to create an air stream through the thrashing machine proper from the entrance to the straw and chaff outlet, a grain elevator for receiving the grain from the shoe and delivering it therefrom, means for operating the aforesaid mechanisms, means for creating a dead air space over the grain pan and the uppermost chaffer-screen of the separating shoe, said means including a turn-back baffle in the cover adjacent to the cylinder case and upwardly directed baffles to the rear of the grain pan, the lower one of which has an apron extending down to the upper chaffer-screen of the shoe, and means to elevate the straw passing along the grain pan above the dead air space at the exit end of the grain pan whereby the straw will be delivered by the air blast above the baffle which has the apron.

17. In standing grain thrashers, a wheeled supporting frame, a grain gathering mechanism carried thereby and including grain severing devices and a suction blower for creating a suction in the gathering mechanism and for delivering the gathered material therefrom, a thrashing machine proper carried by said frame and including a thrashing cylinder and its case, concaves cooperating with the cylinder, a grain pan, a grain separating shoe, a grain pan and shoe cover over the same into which the material is discharged from the cylinder case, said blower having a duct delivering into said cylinder case and serving to create an air stream through the thrashing machine proper from the entrance to the straw and chaff outlet, a grain elevator for receiving the grain from the shoe and delivering it therefrom, means for collecting the unseparated chaff and grain from the shoe and returning it to the thrashing cylinder case, and means for operating the aforesaid parts.

18. In standing grain thrashers, a wheeled supporting frame, a grain thrashing mechanism carried thereby and including grain severing devices and a suction blower for creating a suction in the gathering mechanism and for delivering the gathered material therefrom, a thrashing machine proper carried by said frame and including a thrashing cylinder and its case, concaves cooperating with the cylinder, a grain pan, a grain separating shoe, a grain pan and shoe cover over the same into which the material is discharged from the cylinder case, said blower having a duct delivering into said cylinder case and serving to create an air stream through the thrashing machine proper from the entrance to the straw and chaff outlet, a baffle at the entrance of the thrashing case to direct the air stream toward the advance side of the cylinder, and means for operating the aforesaid parts.

19. In standing grain thrashers, a wheeled supporting frame, a grain gathering mechanism mounted on the frame, and including grain severing mechanism and a suction blower for delivering the grain to the thrashing machine proper, a thrashing machine proper mounted on said frame and including a thrashing cylinder case, said suction blower including a duct for delivering material to the thrashing cylinder case, a thrashing cylinder in said case, a concave below the cylinder adapted to direct the material and the air stream upwardly out of the cylinder case, a baffle in the case at the entrance of the same to direct the material and air stream toward the downgoing side of the cylinder, a grain pan below the cylinder case and including fish-backs having upward extensions at the rear or discharge end of the pan, a grain separating shoe into which the grain pan discharges, means for creating a dead air space over the grain pan and over the separating shoe while maintaining the air stream above said dead air space, means for delivering the grain from the separating shoe, and a blower for removing the chaff from the separating shoe, and means for operating the aforesaid parts.

20. In standing grain thrashers, a wheeled supporting frame, a grain gathering mechanism mounted on the frame, and including grain severing mechanism and a suction blower for delivering the grain to the thrashing machine proper, a thrashing machine proper mounted on said frame and including a thrashing cylinder case, said suction blower including a duct for delivering the material to the thrashing cylinder case, a thrashing cylinder in said case, a concave below the cylinder adapted to direct the material and the air stream upwardly out of the cylinder case, a baffle in the case at the entrance of the same to direct the material and air stream toward the downgoing side of the cylinder, a grain pan below the cylinder case and including fish-backs having upward extensions at the rear or discharge end of the pan, a grain separating shoe into which the grain pan discharges, means for creating a dead air space over the grain pan and over the separating shoe while maintaining the air stream above said dead air space, means for delivering the grain from the separating shoe, and a blower for removing the chaff from the separating shoe, means for operating the aforesaid parts, said dead air space creating means comprising a turn-back baffle adjacent to the discharge place of said thrashing cylinder case and above the grain pan, and means for diffusing the air stream after it passes under the turn-back baffle, in an upward direction toward the straw discharge place, and a hood for receiving the straw and deflecting it toward the ground.

21. In standing grain thrashers, a wheeled supporting frame, a grain gathering mechanism mounted on the frame, and including grain severing mechanism and a suction blower for delivering the grain to the thrashing machine proper, a thrashing machine proper mounted on said frame and including a thrashing cylinder case, said suction blower including a duct for delivering material to the thrashing cylinder case, a thrashing cylinder in said case, a concave below the cylinder adapted to direct the material and the air stream upwardly out of the cylinder case, a baffle in the case at the entrance of the same to direct the material and air stream toward the downgoing side of the cylinder, a grain pan below the cylinder case and including fish-backs having upward extensions at the rear or discharge end of the pan, a grain separating shoe into which the grain pan discharges, means for creating a dead air space over the grain pan and over the separating shoe while maintaining the air stream above said dead air space, means for delivering the grain from the separating shoe, a blower for removing the chaff from the separating shoe, means for operating the aforesaid parts, said concave including a solid section and a perforated section through which grain is adapted to fall onto the grain pan.

22. In standing grain thrashers, a wheeled supporting frame, a grain gathering mechanism mounted on the frame, and including grain severing mechanism and a suction blower for delivering the grain to the thrashing machine proper, a thrashing machine proper mounted on said frame and including a thrashing cylinder case, said suction blower including a duct for delivering material to the thrashing cylinder case, a thrashing cylinder in said case, a concave below the cylinder adapted to direct the material and the air stream upwardly out of the cylinder case, a baffle in the case at the entrance of the same to direct the material and air stream toward the downgoing side of the cylinder, a grain pan below the cylinder case and including fish-backs having upward extensions at the rear or discharge end of the pan, a grain separating shoe into which the grain pan discharges, means for creating a dead air space over the grain pan and over the separating shoe while maintaining the air stream above said dead air space, means for delivering the grain from the separating shoe, a blower for removing the chaff from the separating shoe, means for operating the aforesaid parts, a deflector for directing the chaff from the separating shoe toward the ground and a hood for directing the straw toward the ground, said deflector and said hood being located adjacent to one of the wheels of the supporting frame whereby the larger portion of the chaff is deposited at one side of the wheel and the larger portion of the straw is deposited at the other side of the same.

23. In standing grain thrashers, a wheeled supporting frame, a grain gathering mechanism, pivoted arms secured to the frame for carrying said gathering mechanism, said gathering mechanism including a rotatable stripping cylinder and pan and a suction blower for removing the material from the gathering pan, a thrashing machine proper transversely mounted in said frame between the supporting wheels thereof and including a thrashing cylinder case into which said blower delivers the gathered material, said blower adapted to force an air stream through said thrashing machine proper from the entrance to the exit thereof, said thrashing machine proper including a thrashing cylinder and concave, a grain pan and separating shoe, means for reciprocating said pan and shoe, an auxiliary blower cooperating with the grain separating shoe, a grain elevator for delivering the grain from the separating shoe, means for depositing the straw and chaff on the ground at the sides of one of the wheels of the supporting frame, means for returning unseparated grain and chaff from the shoe to the thrashing cylinder case, means for controlling the passage of the air stream through the thrashing machine, and means for operating the aforesaid parts.

24. In standing grain thrashers, a wheeled supporting frame, a grain gathering mechanism, pivoted arms secured to the frame for carrying said gathering mechanism, said gathering mechanism including a rotatable stripping cylinder and pan and a suction blower for removing the material from the gathering pan, a thrashing machine proper transversely mounted in said frame between the supporting wheels thereof and including a thrashing cylinder case into which said blower delivers the gathered material, said blower adapted to force an air stream through said thrashing machine proper from the entrance to the exit thereof, said thrashing machine proper including a thrashing cylinder and concave, a grain pan and separating shoe, means for reciprocating said pan and shoe, an auxiliary blower cooperating with the grain separating shoe, a grain elevator for delivering the grain from the separating shoe, means for depositing the straw and chaff on the ground at the sides of one of the wheels of the supporting frame, means for returning unseparated grain and chaff from the shoe to the thrashing cylinder case, means for controlling the passage of the air stream through the thrashing machine, means for operating the aforesaid parts, said operating means comprising a power plant carried by said frame and including a first motion shaft, a drive pulley on said first motion shaft, a belt and drive transmission from said power shaft pulley to said grain stripping cylinder of the gathering mechanism, said thrashing machine proper including a crank shaft for effecting oscillations of the grain pan and shoe, a second drive pulley on said first motion shaft, a power transmission connection through said second drive pulley, said thrashing cylinder and said auxiliary blower and a power transmission connection between said auxiliary blower and said crank shaft, and means for driving said gathering mechanism blower from the shaft of said auxiliary blower.

25. In standing grain thrashers, a wheeled supporting frame, a grain gathering mechanism vertically adjustably mounted on the frame and including a transverse stripping cylinder and pan and a suction blower for drawing the material into the pan and delivering the material from the pan to the thrashing machine proper, a thrashing machine proper mounted in the frame transversely thereof, a power plant mounted on the frame including a first motion shaft extending in the longitudinal direction of the machine, a belt drive between the first motion shaft and said stripping cylinder including corner pulleys and a driving belt, said thrashing machine proper including a thrashing cylinder, an auxiliary blower and a grain elevator and a crank shaft for oscillating the grain pan and shoe, and a belt drive for imparting motion from said first motion shaft to said thrashing cylinder, said crank shaft, said auxiliary blower and said grain elevator.

26. In standing grain thrashers, a supporting frame, a thrashing machine proper carried by said frame and including a thrashing cylinder and its case, concaves cooperating with the cylinder, a grain pan, a grain separating shoe, a grain pan and shoe cover over the same into which the material is discharged from the cylinder case, means for blowing the materials to be separated into the thrashing cylinder case and establishing an air current through the thrashing machine proper, a baffle at the entrance of the thrashing case to direct the air stream toward the advance side of the cylinder, and means for operating said aforesaid parts.

27. In standing grain thrashers, a supporting frame, a thrashing machine proper carried by said frame and including a thrashing cylinder and its case, concaves cooperating with the cylinder, a grain pan, a grain separating shoe, a grain pan and shoe cover over the same into which the material is discharged from the cylinder case, and means for creating a dead air space above the discharge end of the grain pan and above the separating shoe and beneath the live air stream, and means for operating the aforesaid parts.

28. In standing grain thrashers, a supporting frame, a thrashing machine proper carried by said frame and including a thrashing cylinder and its case, concaves cooperating with the cylinder, a grain pan, a grain separating shoe, a grain pan and shoe cover over the same into which the material is discharged from the cylinder case, means for blowing the material to be separated into the thrashing cylinder case and establishing an air current through the thrashing machine proper, a baffle at the entrance of the thrashing case to direct the air stream toward the advance side of the cylinder, said last named means comprising a turn-back baffle against which the material and air stream is directed from the thrashing cylinder and concaves, diffusing baffles over the grain separating shoe, the lower one of said diffusing baffles having an apron projected downwardly approximately to the upper chaffer-screen of the separating shoe, and means for operating the aforesaid parts.

29. In standing grain thrashers, a supporting frame, a thrashing machine proper carried by said frame and including a thrashing cylinder and its case, concaves cooperating with the cylinder, a grain pan, a grain separating shoe, a grain pan and shoe cover over the same into which the material is discharged from the cylinder case, means for creating a dead air space above the discharge end of the grain pan and above the separating shoe and beneath the live air stream, means for operating the aforesaid parts, means for delivering the separated grain from the shoe, and means for removing the unseparated grain and chaff from the shoe and returning it to the thrashing cylinder.

30. In standing grain thrashers, a supporting frame, a thrashing machine proper carried by said frame and including a thrashing cylinder and its case, concaves co-operating with the cylinder, a grain pan, a grain separating shoe, a grain pan and shoe cover over the same into which the material is discharged from the cylinder case, means for creating a dead air space above the discharge end of the grain and above the separating shoe and beneath the live air stream, means for operating the aforesaid parts, fish-backs for said grain pan having elevated rear portions to elevate the straw above the dead air space into the path of the air stream.

31. In standing grain thrashers, a wheeled frame comprising a main transversely extending rectangular frame section, supporting wheels mounted at the ends of said frame section, a longitudinally extending frame section secured to said main frame section and extending rearwardly thereof, a thrashing machine mounted on said main frame section substantially balanced over the axis of said wheels, a grain gathering mechanism mounted on and extending in front of said main frame and a power plant on said rearwardly extending frame section with connections for operating said thrashing machine and said grain gathering mechanism, said power plant and said grain gathering mechanism being substantially balanced on the axis of said wheels as a fulcrum, substantially as shown and described.

GEORGE SCHAEFER.